US008560023B2

(12) United States Patent
Luzzatto

(10) Patent No.: US 8,560,023 B2
(45) Date of Patent: Oct. 15, 2013

(54) TELECOMMUNICATIONS POLICY PROGRAM SYSTEMS, PROCESSES AND DEVICES

(75) Inventor: Marco Luzzatto, Tel Aviv (IL)

(73) Assignee: Newval-Tech Knowledge Services and Investments Ltd., Tel-aviv (IL)

( * ) Notice: Subject to any disclaimer, the term of this patent is extended or adjusted under 35 U.S.C. 154(b) by 490 days.

(21) Appl. No.: 12/530,885

(22) PCT Filed: Sep. 22, 2008

(86) PCT No.: PCT/IL2008/001268
§ 371 (c)(1),
(2), (4) Date: Apr. 19, 2010

(87) PCT Pub. No.: WO2009/040796
PCT Pub. Date: Apr. 2, 2009

(65) Prior Publication Data
US 2010/0197290 A1    Aug. 5, 2010

(30) Foreign Application Priority Data
Sep. 25, 2007    (IL) .......................................... 186275

(51) Int. Cl.
*H04M 1/00*    (2006.01)
(52) U.S. Cl.
USPC ...... 455/569.1; 455/418; 455/419; 455/575.2
(58) Field of Classification Search
USPC ......... 455/569.1, 418, 419, 566, 556.1, 575.2
See application file for complete search history.

(56) References Cited

U.S. PATENT DOCUMENTS

| 5,960,367 A | 9/1999 | Kita |
| 2004/0228476 A1 | 11/2004 | Denninghoff |
| 2004/0229658 A1 | 11/2004 | Kim et al. |
| 2004/0266489 A1 | 12/2004 | Chipchase et al. |

FOREIGN PATENT DOCUMENTS

| GB | 2 277 422 A | 10/1994 |
| WO | WO 98/10612 A | 3/1998 |

OTHER PUBLICATIONS

International Search Report from International Patent Application No. PCT/IL2008/001268, filed Sep. 22, 2008.
International Preliminary Report on Patentability and Written Opinion for International Application No. PCT/IL2008/001268 mailed Apr. 8, 2010.

*Primary Examiner* — Temica M Beamer
(74) *Attorney, Agent, or Firm* — Alston & Bird LLP

(57) ABSTRACT

Telecommunications Policy Program Systems, Processes and Devices for the reduction of radiation hazard and/or other risks involved in the use of wireless telecommunication devices, are disclosed in the present application. According to the invention an Authorized User, using a Policy Program, can enable and/or disable at least one of the sound input and/or output channels of a telecommunication device in order to force a Subordinate User to use radiation-safer, and/or otherwise safer, sound input and/or output channels of said telecommunication device. According to two of the several preferred embodiments described in the application, the Policy program can be transferred to the telecommunication device from an external source or be built-in into said device.

9 Claims, 2 Drawing Sheets

TELECOMMUNICATIONS POLICY PROGRAM SYSTEMS, PROCESSES AND DEVICES

CROSS REFERENCE TO RELATED APPLICATIONS

This application is a national stage application filed under 35 U.S.C. 371 of International Application No. PCT/IL2008/001268, filed Sep. 22, 2008, which claims priority from Israeli Application No. 186275, filed Sep. 25, 2007.

BACKGROUND OF THE INVENTION AND PRIOR ART

The use of wireless telecommunication devices, in particular cellular phones, PDA, Smartphones and other handheld devices—hereafter, collectively, TCD—is accompanied by the release of electromagnetic radiation.

TCD also include devices that can be used interchangeably on one or more of wireless, wan, lan and fixed line systems.

The scope of the health hazard deriving from said radiation is yet to be precisely evaluated and remains controversial. This is largely due to the lapse of time necessary to assess the impact of said radiation over the years.

However, there seem to be an agreement the wireless devices radiation is potentially hazardous and the main issue remains to determine what is the dangerous threshold for telecommunication devices users.

While the WHO (world health organization) has not found conclusive evidence of the danger in using cellular phones, other independent studies reached different conclusions.

For instance, a study done by a collection of researchers from many universities and led by Anna Lahkola of the Radiation and Nuclear Safety Authority in Finland, found firm corollary evidence that using a cell phone causes the risk of getting a brain tumor called a glioma to rise on the side of the head preferred for using the phone.

The strongest evidence that nobody can dismiss the risk of exposure to radiation emanated by wireless devices, is found in virtually all User Manuals for TCD which inform the user that they comply with the FCC (Federal Communications Commition of the U.S. Gorvenment as for the limit of RF (radio frequency) exposure generated by the specific TCD.

Said limit of exposure is measured in SAR (specific absortion rate) and is not to exceed 1.6 W/k.

However we look at it, there is a great concern among the public and many of the medical authorities as for the hazard of radiation involved in the use of TCD.

This concern is particularly acute when kids are involved.

Since the skull of children is thinner than adults', their vulnerability to radiation is much higher. Radiation is also suspected of affecting the development of the nervous system.

Besides children, other groups are particularly at risk while using a TCD.

Among these groups are people who have a pacemaker or similar instrument that can fail because of the interference caused by a cellular phone.

Another massive and proved hazard involved in the use of TCD is the loss of concentration while driving.

According to a study by University of Utah, Cell phones are as dangerous as drunk driving.

Some effective solutions for reducing the above mentioned risks already exist. For instance, handsfree headsets, speakerphone functions, hands free car kits—all these allow the user to engage in conversation while keeping the TCD at some distance from the head and the body and, in some cases without having to hold the TCD at all. These devices reduce the user's exposure to radiation, possible interference with pacemakers and the such, and loss of control while driving.

Still, the above mentioned solutions are not as effective as they could be because of the human factor: the solutions are there but the users neglect often to use them.

Thus, for instance, is very difficult and sometimes impossible, to force a child to use a handsfree headset or a speakerphone function.

It is also difficult to prevent a driver from talking while driving and sometimes even without using a handsfree car kit at all.

Therefore the potential benefit of available solutions is very limited.

Some inventions have tried to deal with the radiation problem at the TCD level.

U.S. Pat. No. 5,507,012 discloses a "shield apparatus for absorbing microwave energy from hand held telephones".

U.S. Pat. No. 6,166,707 discloses an "antenna shroud for portable communication devices".

US 23232597A1 discloses a "cellular phone that exposes the user's brain to much less microwave radiation than ordinary cellular phones with the help of a proxy intermediary device".

It is also worth mentioning that certain cellular phones like the TicTalk manufactured by Enfora include some use parental controls but this monitoring relates mainly to the nature of the conversations the kids are allowed to carry out and does not deal with safety or radiation hazard reduction.

All the inventions disclosed in the above mention prior art cannot provide a solution for the hazards posed by the use of TCD because they involve either structural changes or the use of additional devices to be used in conjunction with a TCD, they are expensive, they are not applicable to many existing TCD and require a change in the user's habits. They are therefore, impractical and unlikely to be adopted by the public and manufacturers.

While only in 2007 about 900 million new cellular will be sold and being billions of old ones already in use, there is a need to provide a solution the will reduce the hazard involved in the use of TCD not only for future ones but also for the massive number of already existing ones.

It is purpose of this invention to provide a solution that reduces dramatically the hazard involved in the use of TCD.

It is another purpose of this invention to provide a solution such that it is applicable both to already existing and future TCD.

It is yet another purpose of the invention to provide a solution that does not entail structural changes in the TCD nor the need of new devices, besides the already existing and customary accessories.

It is yet another purpose of the invention to provide a solution that is inexpensive and accessible.

These, and other purposes of the invention will become apparent as the description proceeds.

SUMMARY OF THE INVENTION

Bearing in mind what has been said before and the purposes of the invention, we now disclose Telecommunications Policy Program Systems, Processes and Devices the are designed to reduced the hazards connected to the use of telecommunication devices and in particular cellular phones.

The core of the invention is to allow a user to determine how the telecommunication device can be used by another user while reducing the aforementioned hazards.

This end is achieved without changing structurally the TCD.

Therefore this invention is applicable to future as well as to already existing TCD's.

By "telecommunication device" or in short "TCD", we mean wireless telecommunication devices, in particular cellular phones, PDA, Smartphones and other handheld devices.

The term "TCD" also include devices that can be used interchangeably on one or more of wireless, wan, lan and fixed line systems.

The user that influences how another user will be using the TCD is called the "Authorized User". The Authorized User is the owner of the TCD or any person that has control or authority over the TCD like, for example, a parent who grants his child the use of a TCD.

The user who has no control or authority over the phone will be called the "Subordinate User".

Generally the Authorized User has some preference as for the way the Subordinate User will be using the TCD.

For instance, a parent will often prefer that his/her child should use a handsfree headset because that reduces the amount of radiation absorbed by the child's brain. In order to do so the Authorized User must be able to determine which of the TCD's sound input and/or output channels the Subordinate User will be allowed to use or not.

The term "sound input and/or output channels" in this application applies to any element, hardware and/or software, that enables the user to speak and to listen to the other party in the course of a conversation. Said elements may be built-in in the TCD or may be accessories coupled with the TCD.

The most obvious sound input and/or output channels are the TCD's earpiece, the TCD's microphone, the speakerphone, additional built-in loudspeakers, handsfree headsets of any kind, car handsfree kit etc.

Existing TCD do not offer a way for enabling a Authorized User to determine which sound input and/or output channels may or may not be used by a Subordinate User. It is one of the purposes of this invention to provide an Authorized User with such a possibility.

A preferred embodiment of the invention consists of a server that stores a Policy Program that can be downloaded to the TCD.

Once downloaded to the TCD, the Authorized User can determine which sound input and/or output channels will be enabled or disabled.

The Policy Program gathers and displays—using a Polity Program Interface—the status of the each of the sound input and/or of the output channels available in the specific TCD.

Then, the Authorized User can enable or disable at will any of the sound input and/or of the output channels. The process of doing so results in setting the policy for the use of the TCD sound input and/or of the output channels.

The Policy Program may be downloaded directly to the TCD or to an intermediate device and then to the TCD.

By "intermediate device" we mean any device like a PC or even another TCD that can download the Policy Program and then transfer it to the target TCD.

In another preferred embodiment of the invention, in order to prevent an unauthorized person from making changes in said policy, the Policy Program includes a password in order to access it.

An optional feature of enabling or disabling the removal or deletion of the Policy Program from the TCD also requires to input the password.

A further embodiment of the invention consists of a system that comprises the TCD, different versions of the Policy Program and a server capable of recognizing a specific communicating TCD and of selecting for the same the most suited version of the Policy Program.

In yet an additional embodiment of the invention the Policy Program can be acquired, without downloading it from a server, but rather from a Policy Program Support. Said support consists of any physical element and/or device—e.g a memory card—that can store the Policy Program and can be coupled internally or externally to the TCD and/or to an intermediate device in order for the TCD and/or the intermediate device to acquire or read the Policy Program.

In yet another and preferred embodiment of the invention the Policy Program is built-in or, in any event, present in the TCD at the moment of its purchase thus creating a novel communication device.

BRIEF DESCRIPTION OF THE DRAWINGS

The invention will be understood more fully from the detailed description which follows, and from the accompanying drawings, in which.

DETAILED DESCRIPTION OF PREFERRED EMBODIMENTS

Figure 1:
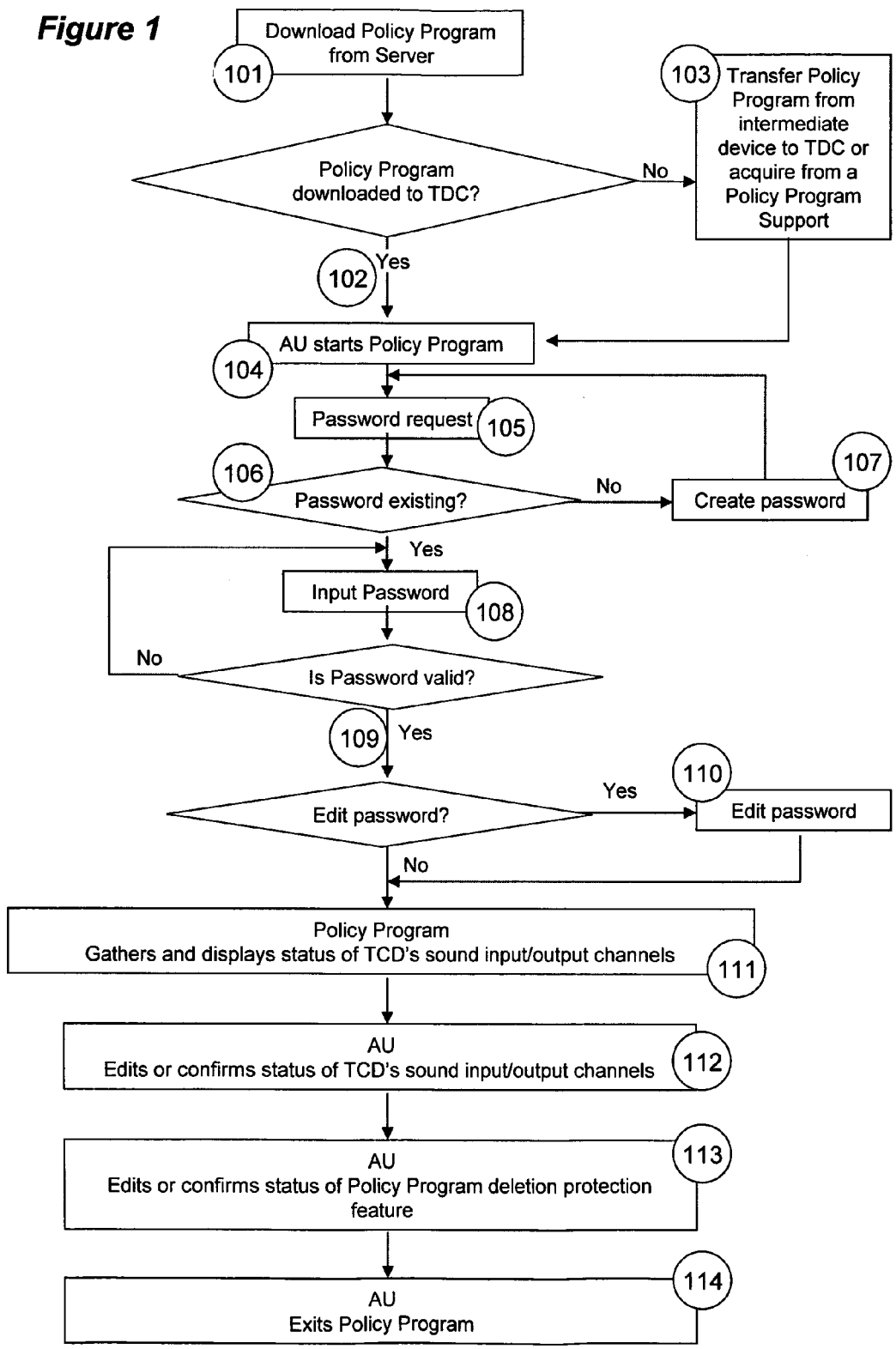
FIG. 1 is a flowchart illustrating one embodiment of the present invention.

Some preferred embodiments of the invention will now be described for purposes of illustration only, it being clear that the invention comprises many other embodiments.

Embodiment 1

In this embodiment the Policy Program is loaded on a Server, typically, but not exclusively, an internet server—from which the Policy Program and/or parts of it and/or updates of the same and/or any elements of the same can be downloaded directly to a TCD or to an intermediate device.

Nowadays most telecommunication devices are equipped with features that allow them to connect to a variety of networks and especially to the internet and/or Lan and/or Wan and perform different operations like, for example, browsing, surfing, and acquiring data—e.g. by downloading—from said networks. The terms "connect", "connectivity" and "networks" are intended in this application in the broadest possible sense and it is irrelevant which specific sense of said terms is utilized. For the sake of example only and in a non limitative way, it is mentioned that commonly a WAP connection suitable for internet access for wireless devices may be conveniently used, but any other connection and or protocol may also be used, thus, the Policy Program may be may be downloaded first directly to the TCD or to an intermediate device, e.g. a PC using a common internet connection for PC internet (for example TCP/IP), and then be transferred to the TCD using any of the available connectivity features between the PC (or another intermediate device) and the TCD. Such connectivity features may consist, for example, of any or the following: USB connection, miniUSB connection, Bluetooth connection, Infrared connection, MMS, SMS and/or any other available connectivity means compatible between the TCD and the intermediate device.

The Policy Program is a software component that allows an authorized user to determine which of the possible sound input and/or output channels of the TCD a subordinate user will be able or not to use in the course of a conversation. The term "sound input and/or output channels" in this application applies to any element, hardware and/or software, that allows the enables the user to speak to and to listen to the other party in the course of a conversation.

The aim of the Policy Program is to allow the Authorized User to force a Subordinate User to use the sound input and/or output channels the Authorized User considers safer or less harmful for the Subordinate User.

Let us consider, for example, the case in which the Authorized User is a parent and the Subordinate User is a son or daughter of the Authorized User.

The Authorized User will probably use the Policy Program to prevent the Subordinate User to use the TCD keeping it close to the head or body. In the case the Authorized User is likely to disable the earpiece and the microphone (see FIG. 2 and related explanation) and enable the use of the speakerphone and the handsfree handset.

If, in another example, the Authorized User is an employer who gives to an employee Subordinate User the use of a business phone, the Authorized User may wish to disable all sound input and/or output channels but the car handsfree kit and the speakerphone in order to ensure that the employee drives safely.

The sound input and/or output channels may be built in elements of the TCD or external and/or add-on devices and accessories coupled in any way with the TCD. The most obvious examples of sound input and/or output channels include: earphone loudspeaker, built-in speakerphone, any additional loudspeaker, built-in microphone, headsets of any kind (Bluetooth, infrared, plugged in etc.) comprising earphone loudspeaker and/or microphone and handsfree-car kit.

Figure 2:
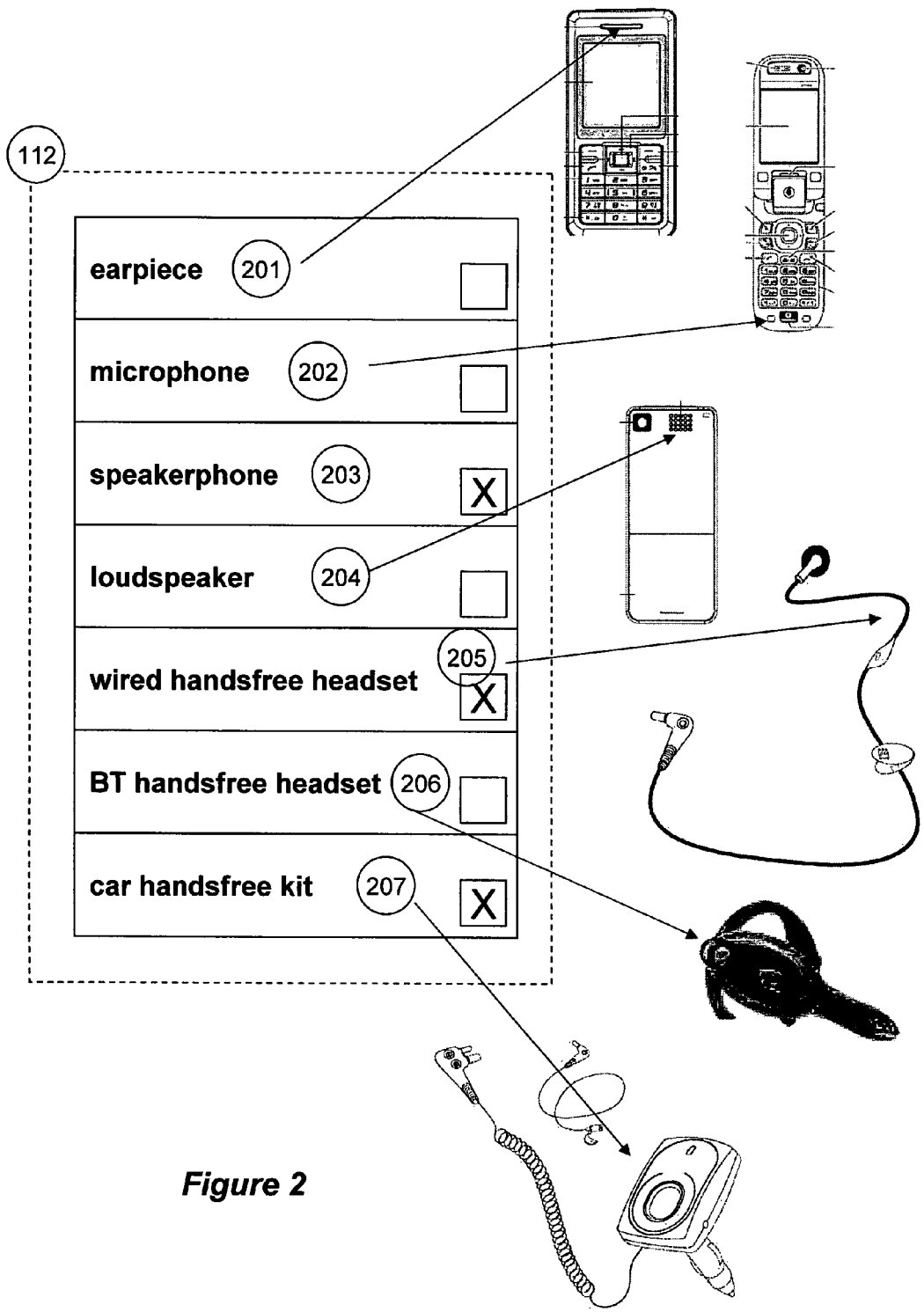
FIG. 2 is a schematic illustration of one of the many possible implementations of the policy program.

The most common types of sound input and/or output channels are additionally described in FIG. 2 and in its description.

The Policy Program can be easily programmed by a programmer skilled in TCD programming and designed to communicate with the software elements that set the status, that is, enable and/or disable at least one of any of the sound input and/or of the output channels.

The above mentioned software elements may be found at different software levels of a telecommunication device, according to its software architecture. Thus, said software elements may be found, for example, at operating system level or at any other any other lower or higher level and/or at any software layer. Said software elements may be an integral part of said levels and layers or e.g. part of an independent functions and/or routines library. Whichever should be the case, they all fall within the same principle and within the scope of the invention.

In any case, the Policy Program must be able to communicate with the relevant software element/s, that is, the software element/s that enable and or disable sound input and/or output channels as explained above.

This embodiment includes a Policy Program Interface, which informs the authorized user of the current status (enabled or disable) of a part or all of the sound input and/or output channels and allows the authorized user to change any time it is required the status of said sound input and/or output channels.

The interface is preferably a visual one—textual and/or graphical one—, e.g. a list of the sound input and/or output means with some visual indication of their status (e.g. a check mark for "enabled" and no mark for "disabled").—see FIG. 2.

Examples of other possible kinds of authorized user interfaces include non-visual interfaces like voice command activated ones or predetermined assigned keys or keys combinations and combinations of different visual and non-visual interfaces.

Embodiment 2

This embodiment includes, in addition to the elements of Embodiment 1, a feature that prompts the user to enter a password in order to be allowed to use the Policy Program.

This, in order to avoid that a Subordinate User may make any change in the status of the sound input and/or of the output channels as defined by the Authorized User. Typically, the Authorized User, inputs the initial password—after purchasing the TCD or after being given control over it by another precedent Authorized—User—and he/she may be change it, whenever and as often it is required.

Methods for defining a password, changing it, recovering it, backing it up and resetting it are very well known to people skilled in the software field and, therefore, will not be described here in detail.

Advantageously, the Policy Program may optionally include a feature that prevents an Unauthorized User to delete or otherwise remove the Policy Program from the telecommunication device.

In other words, the Policy Program may be removed only using the Policy Program Interface after the user has gained access to said interface by inputting the correct password. This, in order to avoid that an Unauthorized User may try to bypass a sound input and/or of the output channels policy set by an Authorized User.

Methods for disabling the removal of a program by a non authorized user from a TCD are also very well known by skilled programmers and will therefore not be described here.

It should be noted that certain sound input and/or of the output channels can be activated or deactivated using functions already built-in in some TCD. For example, many cellular phones have a function that allows to activate/deactivate the speakerphone function by which the user may conduct a conversation using the TCD at some distance and even when placed on a table. In this case, an Unauthorized User may attempt to deactivate the Speakerphone function set by an Authorized User by using the options of the telecommunication built-in function.

Bearing in mind this fact, it is recommendable that the Policy Program may be able to communicate with the relevant software elements, as explained in Embodiment 1, in order to intercept an Unauthorized User request that is in conflict with the sound input and/or of the output channels policy set by the Authorised User, and reject such a request. In other words, it is recommendable that Policy Program be designed in such a way that it takes priority over built-in telecommunication software as far as the status (enabled/disabled) of sound input and/or of the output channels is concerned.

Embodiment 3

This embodiment includes as many of the elements of Embodiments 1 and 2, as desired, but adds to said elements a discriminating feature in the server.

Generally, when downloading a program or any data from a server, the party requesting the program or data is presented with a list of one or more downloadable items—this may also be the case in Embodiment 1 or Embodiment 2—and the requesting party has to select the desired item to be downloaded.

In the case of the present embodiment the Policy Server is provided with a mechanism, namely a software element, that is capable of detecting the identity—that is, the model—of the TCD that is communicating with the Policy Server.

This is a well known technology for PC. For instance, some internet servers are capable of extracting the identity of a PC in communication with the server and behaving accordingly depending on the circumstances and the tasks to be performed, e.g. detecting whether or not the PC is equipped with a software component the server is capable of providing. In other words, the communication between a TCD and the Policy Server may be bidirectional.

Thus, by being able to identify the TCD, if more than a single generic version of the Policy Program is available, the Policy Server may be capable of selecting the best suited version of the Policy Program for a specific device and, optionally, to automatically start the downloading process. It is stressed that the same version of the Policy Program may be functional for a number or a family of TCD's since often essentially identical devices have only insignificant or exterior differences.

Due to the vast number of TCD models it is also possible that the Policy Program may consists of a Generic Policy Program, which contains customizable portions that will allow the user to adapt the Generic Policy Program to a specific TCD, either through a manually procedure or by having the Generic Policy Program automatically analyzing a specific TCD model and, a result, thus creating a suitable Policy Program configuration.

Again, it must be appreciated that all the above mentioned options will be readily understood by any person skilled in the art of telecommunication programming.

Embodiment 4

This embodiment of the invention consist of a system comprising a TCD and any kind of data storage means insertable in the TCD, such, for instance, memory cards, smart cards, Flash cards and the like, that contains the Policy Program—as describes in Embodiments 1 and 2—which may be transferred to the TCD and then function or it may be functioned directly from the storage means—according to the case.

The Policy program may also be acquired by the TCD from a CD, DVD or any other kind of data storage device external to the TCD using the mediation of a PC or of a functionally equivalent device.

More generally, we will refer to any physical element and/or device that stores the Policy Program—including the above mentioned ones—and can be coupled internally or externally to the TCD and/or to an intermediate device, as to "Policy Program Support".

Embodiment 5

In yet another embodiment of the invention, the Policy Program as described in Embodiments 1 and 2, is not downloaded or acquired form any external source but it is built-in in the TCD or, in any case, already present in the device at the moment of its purchase.

The above embodiments have no limiting significance and the invention may be carried out in any way that is comprised in the appended claims.

Furthermore it is stressed that any possible combinations of elements of anyone or more of Embodiments 1 to 5, fall within the scope of the invention and constitute additional embodiments of the same. An example of such an additional embodiment—that will be referred to as "Embodiment 6"—will be illustrated in FIG. 1.

DETAILED DESCRIPTION OF THE DRAWINGS

FIG. 1

FIG. 1 is a flowchart that illustrates Embodiment 6.

At (101) the Policy Program is downloaded from a server as explained in any of Embodiments 1-3.

According to the system configuration, the Policy Program may be downloaded directly to the TCD as shown by "Yes" option (102)—see Embodiment 1.

In other case the Policy Program may be downloaded first from a server to an intermediate device and later transferred to the TCD (103).

Alternatively, the Policy Program can be acquired, without downloading it from a server, from a support like a memory card, a storage device or any other Policy Program Support— see Embodiments 4. In this latter case (101)-(102) are not relevant and the flowchart can be seen as starting from (103).

In the case of Embodiment 5, that if the Policy Program is built-in or, in any event, present in the TCD at the moment of its purchase, stages (101)-(103) are not relevant and the flowchart can be seen as starting from (104).

The Authorized User starts the program (104) and he/she is prompted to input a password (105). In this embodiment of the invention, the password is necessary in order prevent any unauthorized or Subordinate User from changing the policy set by the Authorized User. By the term "policy" it is meant the collection of the statuses ("enabled" or "disabled") of all the different sound input and/or output channels as determined by the Authorized User.

The password is also required in order to change the status of the feature that prevents the user from deleting or removing in any way the Policy Program from the TCD.

If a password has already been defined, the Authorized User can input it (108). If no password has been defined, the user is prompted to create one (107) and then the Authorized User goes back to (105).

After the Authorized User inputs the password, the Policy Program checks for its validity. If the password is invalid the user is prompted again (108) to input the correct password.

If the password is valid (that is, is the correct one) (109) the Authorized User is given the option to change the password. This may be convenient in the case that the Authorized User suspects that a Subordinate User has discovered the current password. After the Authorized User chooses either to edit the password (110) or not do so, he/she proceeds to (111).

At this stage (111) the Policy Program displays the status of the each of the sound input and/or of the output channels available in the specific TCD.

In order to display the status of the sound input and/or of the output channels, the Policy Program has first to gather the data relating to said status.

This can be done in a variety of way. For the sake of example only and in a non-limitative way, the Policy Program could include a simple module that functions as what is commonly know as a "diagnostic" program. Such a module that we will refer to as "diagnostic module", basically "interrogates" the TCD about the presence and/or the status of the different sound input and/or of the output channels. This "interrogation" may be done by having the Policy Program communicating with the TCD's operating system or any other relevant software element of the TCD.

After the data about the current status of the different sound input and/or of the output channels of the TCD is gathered, this data is displayed through the Program Policy Interface— see embodiment 1. The Policy Program Interface will be elaborated upon in FIG. 2 and in its related explanation.

Next (112) the Authorized User may edit or confirm the status of the different sound input and/or of the output channels. By doing so, the Authorized User defines the current policy for the usage of the TCD's sound input and/or of the output channels. Optionally, the data relating to current status could be stored for inspection before rerunning the diagnostic module but it is highly recommendable that the diagnostic module be run newly each time the Authorized User enters the Policy Program in order to rectify possible successful attempts of Subordinate User to tamper with the current policy set by an Authorized User.

After completing the policy setting process for the TCD's sound input and/or of the output channels, the Authorized User can decide (113) whether edit or confirm the status of the Policy Program deletion protection feature.

This feature, when enabled, prevents a Subordinate or unauthorized User from deleting or otherwise removing the Policy Program from the TCD—see Embodiment 2.

Obviously, in the case of a Policy Program is built-in in the TCD—for instance but not exclusively, is part of the TCD system and/or part of the TCD standard software and/or is already present in any for in the TCD at the moment of its purchase—it is likely that the TCD manufacturer will set by default, or even permanently, the Policy Program deletion protection feature as "disabled".

Next (114) the Authorized User can exit Policy Program.

To avoid any doubt, it is stressed that the elements of Embodiment 6 and the corresponding elements of the Flowchart in FIG. 1 may be arranged in a different configuration and order and may include additional elements of lack some of the specified ones without departing from the spirit of this Embodiment.

FIG. 2

FIG. 2 illustrates one of the many possible graphic implementation of the portion of the Policy Program utilized in what was described in FIG. 1 in stage (112).

At this point (112), as explained before, the Authorized User may edit or confirm the status of the different sound input and/or of the output channels. By doing so, the Authorized User defines the current policy for the usage of the TCD sound input and/or of the output channels.

In FIG. 2 we can schematically see a menu showing a list of sound input and/or of the output channels available in a certain TCD.

This list is merely illustrative and not limitative in any way. Several other sound input and/or output channels could have been listed in menu but this is irrelevant for the purpose of the description.

By the name of each individual sound input and/or of the output channel there is a box that is either marked or not with a "X" sign. If the box is marked with "x" sign, it means that the corresponding individual sound input and/or output channel has been selected by the Authorized User and, therefore the current status of said sound input and/or of the output channel is "enabled".

The status of the unselected sound input and/or of the output channels is obviously "disabled".

It goes without saying that the entire list shown in FIG. 2 does not have to be visible simultaneously on the TCD screen, especially if the list is very lengthy and contains a large number of items.

The Authorized User, according to the invention may scroll the list or advance through portions of same by dividing the list in a number of screens, according to the specific implementation of the Policy program Interface and/or according to the individual TCD's features.

The Authorized User can freely toggle between the "enabled" and "disabled" status of each sound input and/or of the output channel in a variety of ways including, but not exclusively. clicking with a TCD pointing/and or navigation device or by using a TCD button assigned in the interface for that purpose.

The physical solution for selecting and/or deselecting (that is, enabling or disabling) an individual sound input and/or of the output channel, may vary according to a specific implementation of the Policy Program Interface and/or according to the TCD's hardware but all possible variations are fall within the scope of the invention.

The current status of the sample sound input and/or of the output channels in FIG. 2 is as follows:
1) earpiece—disabled
2) microphone—disabled
3) speakerphone—enabled
4) loudspeaker—disabled
5) wired handsfree headset—enabled
6) Bluetooth handsfree headset—disabled
7) car handsfree kit—enabled The collection of all the current individual statuses of the sound input and/or of the output channels constitutes the current sound input and/or of the output channels policy.

Optionally, the Policy Program Interface may list, in addition to generic and/or default sound input and/or of the output channels, also specific ones and allow the enabling/disabling of the same.

For example, let's us suppose that the Policy Program is running in a Nokia phone. Then, the policy program may list and allow only the use of a Nokia original Bluetooth handsfree headset or of another manufacturer e.g. a Bluetooth handsfree headset by Jabra and exclude other manufacturers devices.

This, of course requires not only the Policy Program Interface to list the allowed devices but also the diagnostic module of the Policy Program to verify the identity of an accessory and to allow or inhibit its use.

FIG. 2 symbolically shows, by the listed individual sound input and/or of the output channels (except for the speakerphone), the physical representation of said individual sound input and/or of the output channel.

Now we will shortly elaborate on the above mentioned sound input and/or output channels bearing in mind that these ones are only few out of many possible sound input and/or of the output channels and that additional ones are not mentioned only for the sake of brevity.

(201) earpiece—sometimes referred to also as "earphone loudspeaker" or "speaker" is the default loudspeaker used in a course of a conversation in order to hear the other party.

(202) microphone—" is the default microphone used in a course of a conversation in order to speak to the other party.

(203) speakerphone—sometimes referred to as "handsfree" is a feature the allows the user to carry out a conversation without holding the TCD close to the head. The speakerphone feature may be implemented using dedicated components or generic TCD sound input and/or output channels operated in a different way, e.g. having the speaker driven with greater power.

(204) loudspeaker—sometimes referred to as "boosted loudspeaker" is an additional loudspeaker—if mono—and some TCD's are equipped with two—stereo—loudspeakers.

The loudspeaker is generally located at the rear or the side of the TCD and is used to play music and/or ringtones and/or as an element in the speakerphone function.

(205) (wired) handsfree headset—sometimes referred to as "handsfree kit". It comprises a microphone and earpiece (in the form of a earbud) connected by a wire and, normally, a clip to attach the device to the user's cloths. It is plugged to the TCD using a handsfree headset jack. It can be either mono or stereo.

The handsfree headset allows the user to conduct a conversation without having to hold the TCD close to the head.

(206) Bluetooth handsfree headset—or "Bluetooth handsfree" it has the same purpose of the wired handsfree headset but communicates with the TCD wirelessly, by Bluetooth connection.

(207) car handsfree kit—it has a similar purpose to that of (205) and (206) but it is specially fit for carrying out a conversation while driving. It can be wired or communicate by Bluetooth. It can also be permanently mounted in the car or removable.

To conclude the description of FIG. 2 it is also stressed that the Policy Program Interface could also—as mentioned in Embodiment 1—be implemented in a non visual way, e.g. by assigning a dedicated key combination to each particular sound input and/or of the output channel or by using voice activation.

The invention claimed is:

1. Method for the reduction of exposure of a user to the electromagnetic radiation emitted by a wireless telecommunication device, comprising:
    activating the Policy Program present in the wireless telecommunication device by an Authorized User;
    showing for each sound input and/or output channel available for the wireless telecommunication device, using the Policy Program interface, whether said sound input and/or output channel is enabled or disabled for use;
    enabling or disabling one or more of said sound input and/or output channels of the wireless telecommunication device upon receiving an input from the Authorized User;
    causing the status of each of said sound input and/or output channels, as set by the Authorized User, to be unchangeable except by using the Policy Program;
    exiting the Policy Program.

2. Method according to claim 1 whereby at least changing the enabled or disabled status is carried out by an Authorized User and whereby, after completion of changing the enabled or disabled status, the wireless telecommunication device is used for conversation by either a Subordinate User or by the Authorized User.

3. Method according to claim 1 whereby changing the enabled or disabled status of one or more of said sound input and/or output channels further comprises receiving a confirmation from the Authorized User.

4. Method according to claim 1 whereby an earpiece and/or a microphone of the wireless telecommunication device are disabled and, at least one of the enabled sound input and/or output channels is a headset or another device which enables conversation without holding the wireless telecommunication device close to a head and/or a body.

5. Method according to claim 1 whereby the wireless telecommunication device is any one of the following: a cellular phone, a PDA, a smartphone, a handheld device or any other wireless telecommunication device.

6. Method according to claim 1 whereby the sound input and/or output channels are one or more of the following: earpiece, microphone, speakerphone, loudspeaker, wired handsfree headset, Bluetooth handsfree headset, car handsfree kit and/or any other sound input and/or output channel usable to conduct a conversation.

7. Method according to claim 1 whereby the Policy Program further requires a password to be inputted as a condition to perform one or more of the following:
    enabling or disabling any one or more of the sound input and/or output channels, and/or deleting or removing the policy software.

8. Method according to claim 1 whereby the Policy Program is either built in or otherwise present in the wireless telecommunication device, or it is transferred to the wireless telecommunication device.

9. Method according to claim 1 whereby the Policy Program is designed as to enable or disable specific headsets or other external sound input and/or output channels used in conjunction with the wireless telecommunication device according to the model of said external sound input and/or output channels.

* * * * *